Patented May 8, 1934

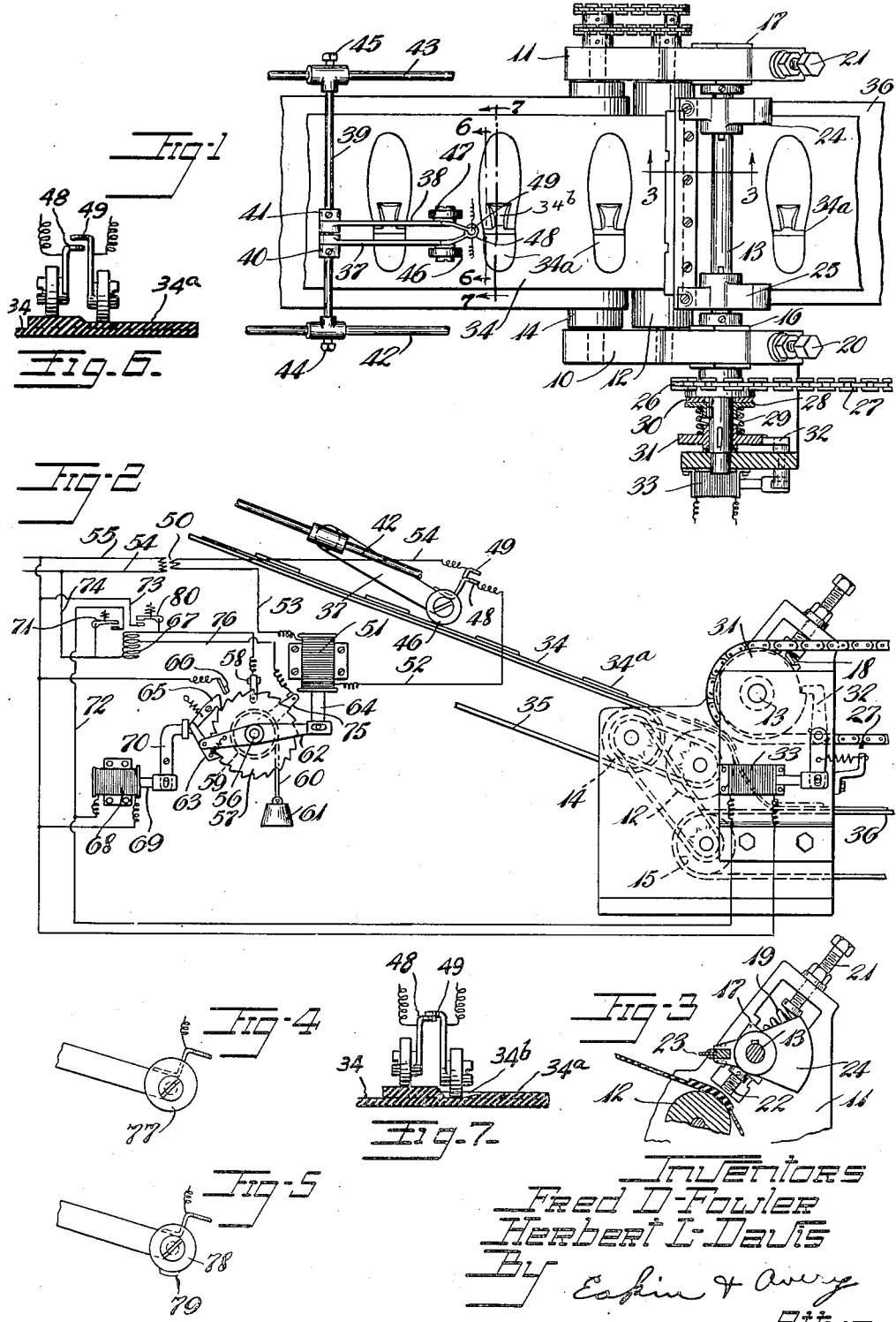

1,958,138

UNITED STATES PATENT OFFICE 1,958,138

APPARATUS FOR CUTTING STRIP MATERIAL

Fred D. Fowler, Newton, and Herbert L. Davis, Walpole, Mass., assignors to Hood Rubber Company, Inc., Watertown, Mass., a corporation of Delaware Application August 23, 1933, Serial No. 686,392

4 Claims. (Cl. 164—68)

This invention relates to apparatus for cutting sections from a travelling strip of material and is especially useful in cutting lengths of embossed rubber such as calendered rubber sole stock.

The principal objects of the invention are to provide accuracy and economy of operation, and to provide electrical control of the device.

Other objects will appear from the following description and the accompanying drawing:

In the drawing:

Fig. 1 is a plan view of the device, the conveyor belts being broken away and part of the drive being shown in section.

Fig. 2 is a side elevation of the device, the electrical apparatus being shown diagrammatically.

Fig. 3 is a sectional detail view taken on line 3—3 of Fig. 1.

Fig. 4 is a detail drawing showing a modified strip contacting finger.

Fig. 5 is a similar view showing another modified form of strip contacting finger.

Fig. 6 is a detail view showing the contact fingers and the slab of material, the rollers of the contact fingers being shown as contacting on line 6—6 of Fig. 1 of the slab and out of contact with each other.

Fig. 7 is a similar view showing the contact fingers in contact with each other and with their rollers contacting with the slab along line 7—7 of Fig. 1.

Referring to the drawing:

The numerals 10 and 11 designate a pair of vertically disposed frame members which are provided with bearings in which an anvil roll 12, a cutter supporting shaft 13, and a pair of conveyor supporting rolls 14 and 15 are rotatably journaled. The cutter supporting shaft is journaled in boxes 16, 17 which are slidably mounted in the frame members and are urged toward the mandrel roll by springs 18, 19. Screws 20, 21 are provided for adjusting the initial tension on the springs and stop screws 22 are also provided to limit the travel of the knife shaft toward the anvil.

The anvil roll is of hardened steel. The cutter comprises a knife bar 23 supported from the shaft 13 by a pair of counterbalancing arms 24, 25.

The means for rotating the knife bar shaft comprises sprocket 26 rotatably mounted on shaft 13 and driven by a chain 27 from any source of power (not shown). A disc 28 is slidably but non-rotatably mounted on the same shaft and is urged toward the sprocket 26 by a coil spring 29. A friction disc 30 is loosely mounted between sprocket 26 and disc 28. The arrangement constitutes a friction drive. A single toothed ratchet disc 31 is rigidly mounted on shaft 13 and a detent 32 is pivoted on the frame of the machine and engaged with the single tooth on disc 31 so as normally to prevent its rotation. The detent may be retracted by a solenoid 33 to permit rotation of shaft 13. The arrangement is such that when the locking mechanism is engaged the sprocket 26 will rotate with respect to the shaft, but when the solenoid is energized to retract the detent the cutter shaft will be rotated.

The anvil roll 12 and the conveyor rolls 14 and 15 are driven at a uniform surface speed from any source of power (not shown) and the strip of rubber 34 or other material is carried to the cutting device by a conveyor belt 35 which passes around roller 14 and away from the cutter upon a conveyor 36 which passes around roll 15. Between conveyors 35 and 36 the strip passes over the anvil roller 12 and under the cutting knife.

In order to regulate the cutting of the strip at proper intervals a pair of contact fingers 37 and 38 are pivoted to a cross rod 39 and may be adjusted therealong and retained by a pair of collars 40, 41. Rod 39 is movable along the conveyor 35 and for this purpose is adjustably mounted on rods 42, 43 by set screws 44, 45. Each contact finger carries a roller 46, 47 which rests upon the strip of material to be cut. The fingers also carry cooperating electrical contacts 48, 49. These contacts are so arranged that when the finger 37 rides over an elevation 34a in the stock it will contact with finger 38 riding on a less elevated part 34b of the stock, as shown in Fig. 7, and complete an electrical circuit. At any other position of the slab, as where the rollers of the contact fingers contact with the slab along line 6—6 of Fig. 1, as illustrated in Fig. 6, when the relative displacement of the fingers is less, no contact of the fingers with each other occurs and therefore the circuit is not completed.

The contactor circuit includes the secondary 50 of a transformer, a solenoid 51 and the wires 52, 53, and 54. The transformer has its primary supplied by lines 54, 55 from a source of alternating current (not shown).

The solenoid 51 is part of a counting mechanism whose function is to operate the solenoid 33 and cause the strip to be severed after a predetermined number of projections have passed thereunder. This mechanism may be located at any convenient position and is as follows:

A rotatable shaft 56 has fixed thereto a ratchet wheel 57 carrying a contact 58, and a drum 59. A cable 60 has one end fast to the drum and the other end fast to a weight 61. An arm 62 is rotatably mounted on shaft 56 and carries a pawl 63 at one end in position to engage the ratchet 57. The other end of the arm is adapted to be actuated by an armature 64 acted upon by solenoid 51. A detent 65 normally prevents back-running of the ratchet 57. The arrangement is such that each closing of the circuit which includes solenoid 51 advances the ratchet wheel one notch. A contact 66 is located in the path of contact 58. Contact 66 is connected to power line 55 and contact 58 is connected through a split solenoid 67 to the power line 54. When the ratchet wheel has been advanced far enough to cause contact 58 to touch contact 66 the circuit through solenoid 67 is completed. This accomplishes resetting of the ratchet and cutting of the strip as follows:

A solenoid 68 is arranged so that its armature 69 when attracted by the solenoid will, through a lever 70, lift the detent 65 from the ratchet and also lift the pawl 63 therefrom permitting the weight 61 to rotate the ratchet in a clockwise direction. A movable armature 71 is located so as to close a circuit between a line 72 and line 54 when the solenoid 67 is energized. Solenoids 68 and 33 are connected across lines 72 and 55 and armature 71 is connected to the line 54, therefore closing of the armature 71 simultaneously energizes solenoids 33 and 68.

In order to assure more than momentary energizing of solenoid 67 and consequently solenoids 33 and 68, additional means is provided to continue the contact of armature 71 as follows: A second armature 80 is also actuated by solenoid 67 simultaneously with the closing of armature 71, and this closes a circuit including solenoid 67, a line 73 connected with line 55 and a line 74 connected to line 54. The arrangement being such that both armatures 71 and 80 are held in closed position until after contact 58 has left contact 66.

To reset the device for the next cut, an adjustable arm 75 is mounted provided with a contact in the path of contact 58. This contact is connected by a line 76 to an intermediate point of the solenoid 67. When the contact 58 reaches its initial position, contact 58 engages the contact on arm 75 and shunts a part of the solenoid. This weakens the magnetic strength of solenoid 67 so as to release armatures 71 and 72. By adjustment of arm 75 the length of the strip between cuts can be regulated.

Where the strip 34 is not embossed so as to periodically raise finger 37 an eccentric wheel 77, as shown in Fig. 4 or a wheel 78 having a hump 79 thereon, as shown in Fig. 5, may be substituted for the concentric wheel 46 shown in Figs. 1 and 2. The circumference of the disc would then determine the shortest length possible to cut with the device and multiples thereof in length could be cut by adjustment of the arm 75.

The cutter shaft 13 is rotated at greater velocity than the anvil roll so as to provide cutting without delay in the travel of the strip.

The operation of the device is as follows:

The arm 75 is set according to the number of embossed portions 34a desired in each piece cut. The strip 34 is advanced over conveyor 35 and over anvil roll 12. As each pair of embossed portion 34a, 34b, passes under rollers 46, 47, the circuit through solenoid 51 is completed causing an advance of the ratchet 57 step by step. When the proper number of embossed portions have passed cutter 23 will be released and will make one revolution, the detent 32 preventing continued revolution thereof. Simultaneously the weight 61 will reset the ratchet wheel and open the solenoid circuits.

We claim:

1. Apparatus for cutting sections from a strip of material, said apparatus comprising a driven roll, a cutter rotatably mounted to cooperate therewith, means for feeding a strip of material to said roll, means for frictionally driving said cutter at a velocity exceeding that of the roll, means to normally lock the cutter against rotation and means cooperating with the strip of material for intermittently releasing the cutter.

2. Apparatus for cutting sections from a strip of material embossed, said apparatus comprising a driven roll, a cutter rotatably mounted to cooperate therewith, means for feeding a strip of material to said roll, means for frictionally driving said cutter, means for normally locking the cutter against rotation, and means located in advance of the cutter and contacting with embossed elements of the face of the strip for releasing the cutter.

3. Apparatus for cutting sections from a strip of embossed material, said apparatus comprising a driven roll, a cutter rotatably mounted to cooperate therewith, means for feeding a strip of material to said roll, means for frictionally driving said cutter, means to normally lock the cutter against rotation, and means in advance of the cutter and contacting only with the face of the uncut strip for releasing the cutter at determinate intervals.

4. Apparatus for cutting sections from a strip of material, said apparatus comprising means for feeding a strip of material, means located in the path of the strip for severing the strip, means to normally lock the severing means against movement, means actuated by embossed elements of the strip for advancing a timing mechanism by successive step by step movements, and means actuated by the timing mechanism after a set number of step movements to release the cutter and reset the device.

FRED D. FOWLER.
HERBERT L. DAVIS.